United States Patent [19]

Dieck

[11] 4,271,064

[45] Jun. 2, 1981

[54] MODIFIED POLYESTER COMPOSITIONS

[75] Inventor: Ronald L. Dieck, Evansville, Ind.

[73] Assignee: General Electric Company, Pittsfield, Mass.

[21] Appl. No.: 1,535

[22] Filed: Jan. 8, 1979

[51] Int. Cl.$^3$ .......................... C08K 3/16; C08K 3/40; C08L 67/06

[52] U.S. Cl. .......................... 260/40 R; 260/45.7 R; 260/45.7 P; 260/45.75 B; 260/45.8 N; 260/45.9 R; 260/45.9 NP; 525/92; 525/95; 525/96

[58] Field of Search ...................... 260/873, 869, 40 R, 260/45.7 P, 45.7 R, 45.7 L; 525/92, 95, 96, 45.7 P, 45.7 R, 45.9 NP, 45.9 R, 45.8 N, 45.75 B

[56] References Cited

U.S. PATENT DOCUMENTS

| | | | |
|---|---|---|---|
| 3,953,394 | 4/1976 | Fox et al. | 260/873 |
| 4,090,996 | 5/1978 | Gergen et al. | 260/873 |

*Primary Examiner*—J. Ziegler
*Attorney, Agent, or Firm*—Morgan, Finnegan, Pine, Foley & Lee

[57] ABSTRACT

Modified thermoplastic polyester compositions are provided which comprise (a) a poly(1,4-butylene terephthalate) resin or polyester copolymer and, optionally, a poly(ethylene terephthalate) resin and (b) a modifier therefor comprising a combination of a selectively hydrogenated block copolymer resin of a vinyl aromatic monomer (A) and a conjugated diene (B) of the A-B type, and an aromatic polycarbonate, and, optionally (c) filler and/or reinforcing agent and/or (d) a flame retardant. Modifier (b) provides enhanced resistance to impact fracture, increased strength and improved resistance to heat distortion in articles molded from the compositions.

14 Claims, No Drawings

MODIFIED POLYESTER COMPOSITIONS

This invention relates to modified thermoplastic polyester compositions which are moldable articles of improved impact strength and thermal resistance. More particularly, the invention pertains to compositions of (a) a poly(1,4-butylene terephthalate) resin or a polyester copolymer resin and, optionally, a poly(ethylene terephthalate) resin which are modified with (b) an effective amount of a resinous combination comprising a selectively hydrogenated block copolymer resin of a vinyl aromatic monomer (A) and a conjugated diene (B) of the A-B type and an aromatic polycarbonate and, optionally, (c) filler and/or reinforcing agent and/or (d) a flame retardant.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, alone or combined with reinforcements, in comparison with other thermoplastics, offer a high degree of surface hardness and abrasion resistance, high gloss, and lower surface friction.

Stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference.

Block copolyesters containing units derived from poly(1,4-butylene terephthalate) and from an aromatic/aliphatic or aliphatic polyesters are also known. See, copending application U.S. Ser. No. 752,325, filed Dec. 20, 1976, pending incorporated herein by reference. Such block copolyesters are useful per se as molding resins and also in intimate combination with poly(1,4-butylene terephthalate) and/or poly(ethylene terephthalate).

It has been proposed to increase the impact strengths of polyesters by adding various modifiers. For example, Brinkmann et al in U.S. Pat. No. 3,591,659 disclose that a useful family of modifiers comprises polyalkyl acrylates, methacrylates and/or ethacrylates. Baron et al in U.S. Pat. No. 4,044,073 disclose that a useful impact modifier for such polyesters is an aromatic polycarbonate. Schlichting et al in U.S. Pat. No. 4,022,748 disclose that a rubber-elastic graft copolymer having a glass temperature below −20° C. is a useful modifier. Lane, U.S. Pat. No. 4,034,013, and Farnham et al, U.S. Pat. No. 4,096,202 disclose that useful impact modifiers comprise multiple stage polymers having a rubbery first stage and a hard final stage, preferably including units derived from alkyl acrylates, especially butyl acrylates. Baron et al in U.S. Pat. No. 4,034,016 (corres. German Pat. No. 2650870) disclose an impact modifier combination comprising a blend of a polyurethane and an aromatic polycarbonate. Copending application Ser. No. 870,679, filed Jan. 19, 1978, and now U.S. Pat. No. 4,203,887, discloses an impact modifier combination comprising a segmented block copolyester and an aromatic polycarbonate. Gergen et al, U.S. Pat. No. 4,090,996, disclose a combination of a selectively hydrogenated monoalkenyl arene-diene copolymer not of the A-B type and an engineering thermoplastic, e.g., a polycarbonate. All of the foregoing patents and the applications are incorporated herein by reference. Filled, reinforced and/or flame retardant modifications of such polyesters are also well known in the art.

It has now been discovered that such polyesters can be greatly improved in impact strength, as well as distortion temperature under load (DTUL) by intimately admixing therewith an impact improving modifier combination comprising a selectively hydrogenated block copolymer resin of a vinyl aromatic monomer (A) and a conjugated diene (B) of the A-B type, and an aromatic polycarbonate resin. As will also be shown, the new compositions of this invention can be reinforced, filled, reinforced and filled, and all modifications can be rendered flame-retardant.

DESCRIPTION OF THE INVENTION

According to this invention, there are provided thermoplastic compositions which are useful for molding, e.g., injection molding, compression molding, transfer molding, and the like the compositions comprising:
(a) a polyester comprising:
  (i) a poly(1,4-butylene terephthalate) resin;
  (ii) a blend of a poly(1,4-butylene terephthalate) resin and a poly(ethylene terephthalate) resin;
  (iii) a block copolyester of poly(1,4-butylene terephthalate) and an aromatic/aliphatic or aliphatic polyester;
  (iv) a blend of (iii) and a poly(ethylene terephthalate) resin; or
  (v) a blend of (iii) and a poly(1,4-butylene terephthalate) resin; and
(b) an impact modifier therefor comprising a combination of:
  (i) a selectively hydrogenated block copolymer resin of a vinyl aromatic monomer (A) and conjugated diene (B) of the A-B type; and
  (ii) an aromatic polycarbonate resin, in an amount of up to 60 parts per 100 parts by weight of (a) and (b) together.

The polyester resins (a) of the compositions of this invention are available commercially or can be prepared by known techniques such as by the alcoholysis of esters of terephthalic acid with ethylene glycol or butanediol and subsequent polymerization, by heating the glycols with the free acids or with halide derivatives thereof, and similar processes. These are described in U.S. Pat. Nos. 2,465,319 and 3,047,539, and elsewhere. As has been mentioned, preparation of the block copolyesters is described in Borman, Dolce and Kramer, U.S. Ser. No. 752,325, filed Dec. 20, 1976, and incorporated herein by reference.

Illustratively, the high molecular weight polyesters will have an intrinsic viscosity of at least about 0.4 deciliters/gram and preferably, at least 0.6 deciliters/gram as measured in a 60:40 phenol/tetrachloroethane mixture at 30° C.

Especially useful when high melt strength is important are branched high melt viscosity poly(1,4-butylene terephthalate) resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

Impact modifier (b) comprises a combination of (i) a hydrogenated A-B block copolymer resin and (ii) an aromatic polycarbonate. The A-B block copolymer resins (b)(i) can be made in known ways and they are available from a number of sources, e.g., Shell Chemical Co., under the trade designation VIS-50.

In general, the technology used to prepare styrene-diene block copolymers described in Encyclopedia of Polymer Science and Technology, Volume 15, Interscience, N.Y. (1971), page 508 et seq. can be used to make A-B block copolymers suitable for this invention from styrene, α-methyl styrene, vinyl toluene, etc., and from conjugated dienes, such as butadiene, isoprene, etc. Selective hydrogenation is carried out in known ways, and means that the aliphatic unsaturation is substantially completely hydrogenated, leaving aromatic unsaturation relatively unaffected. The polycarbonate resins (b)(ii) can be made in known ways and they are available commercially from sources, e.g., General Electric Company, Pittsfield, Mass., U.S.A., under the trademark LEXAN. In general, any of the aromatic polycarbonates described in Baron et al, U.S. Pat. No. 4,034,016 can be used, especially those including units derived from bisphenol-A.

In certain preferred features the composition will include fillers, especially reinforcing fillers such as fibrous (filamentous) glass or mineral fillers, such as clay, mica, talc and the like, preferably clay. The fillers can be untreated or treated with silane or titanate coupling agents, etc. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-alumina borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 250 inch.

The amount of the filler can vary widely depending on the formulation and needs of the particular composition, it being essential only that an amount is selected which is at least sufficient to provide reinforcement. Preferably, however, the reinforcement and/or filler will comprise from about 1 to about 60% by weight of filler (c) and (a) and (b), combined.

It has further been found that even relatively minor amounts of the modifier (b) are effective in providing significant improvements in impact strength, and the like. In general, however, the modifier (b) will be present in amounts of at least about 1% by weight, preferably from about 2.5 to about 50% by weight of (a) and (b). The ratio of A-B block copolymer to aromatic polycarbonate can vary widely, i.e., within the range of 1 to 99 parts of the former to, correspondingly, 99 to 1 parts of the latter, but in general, from 60 to 40 parts of the A-B block copolymer will be present for each 40 to 60 parts of the aromatic polycarbonate per 100 parts by weight of (b).

The impact modified polyesters, alone, or in combination with a filler can be rendered flame retardant with an effective amount of a conventional flame retardant agent (d). As is well known, flame retardants can be based on elementary red phosphorus, phosphorus compounds, halogen and nitrogen compounds alone or preferably in further combination with synergists, such as antimony compounds. Especially useful are polymeric and oligomeric flame retardant agents comprising tetrabromobisphenol-A carbonate units, see, for example, Wambach, U.S. 3,833,685, which is incorporated herein by reference.

Other ingredients, such as dyes, pigments, drip retardants, and the like can be added for their conventionally employed purposes.

The compositions of this invention can be prepared by a number of procedures. In one way, the modifier and any reinforcement, e.g., glass fibers, or non-reinforcing filler or fire retardants is put into an extrusion compounder with the resinous components to produce molding pellets. The modifier, and filler and/or reinforcement, if any, is dispersed in a matrix of the resin in the process. In another procedure, the modifier is mixed with the resins by dry blending, then either fluxed on a mill and comminuted, or then are extruded and chopped. The modifying agent can also be mixed with the resins and directly molded, e.g., by injection or transfer molding techniques.

It is always important to thoroughly free all of the ingredients; resin, modifier, reinforcement, filler, if used, and any optional, conventional additives from as much water as possible.

In addition, compounding should be carried out to ensure that the residence time in the machine is short; the temperature is carefully controlled; the friction heat is utilized; and an intimate blend between the resin and the modifier is obtained.

Although it is not essential, best results are obtained if the ingredients are pre-compounded, pelletized and then molded. Pre-compounding can be carried out in conventional equipment. For example, after carefully pre-drying the polyester and modifier and the reinforcing agent, or filler, if used, e.g., under vacuum four hours at 250° F., a single screw extruder is fed with a dry blend of the ingredients, the screw employed having a long transition section to ensure proper melting. On the other hand, a twin screw extrusion machine, e.g., a 53 mm Werner Pfleiderer machine can be fed with resin and additives at the feed port and reinforcement down stream. In either case, a generally suitable machine temperature will be about 450° to 560° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 450°–525° F. and conventional mold temperatures, e.g., 130°–150° F.

DESCRIPTION OF THE PREFERRED EMBODIMENTS

The following examples illustrate the invention. They are set forth as a further description but are not to be construed as limiting the invention thereto.

EXAMPLES 1–2

Dry blends of poly(1,4-butylene terephthalate) resin (PBT), intrinsic viscosity 1.05 dl/g., melt viscosity 7250–9000 poise, hydrogenated styrene-butadiene A-B block copolymer, aromatic polycarbonate of bisphenol-A and phosgene and mold release/stabilizer are compounded and extruded at 520° F. in an extruder. The extrudates are pelletized and injection molded at 520° F. (mold temperature 130° F.). The formulations and physical properties are shown in Table 1.

TABLE 1

Compositions Comprising Polyester, A Styrene-Butadiene A-B Block Copolymer and an Aromatic Polycarbonate

| Example | 1 | 2 |
|---|---|---|
| Composition (parts by weight) | | |
| Poly(1,4-butylene terephthalate)[a] | 69.8 | 68.3 |
| S/B A-B Block copolymer[b(i)] | 15 | 15 |
| Aromatic polycarbonate[b(ii)] | 15 | 15 |
| Mold release/stabilizers (to make 100) | | |
| Properties | | |
| Distortion temperature Under Load, °F. at 264 psi | 142 | 144 |
| Tensile strength, psi | 7000 | 6225 |
| Flexural strength, psi | 10,700 | 10,100 |
| Modulus, psi | 280,000 | 280,200 |
| % elongation | 256 | 152 |
| Notched Izod impact strength, ft.lbs./in. 1/8" | 2.8 | 3.09 |
| Unnotched Izod impact strength, ft. lbs./in. 1/8" | 5-no break | no break |

[a]Valox 315, General Electric Co.
[b(i)]VIS-50, Shell Chemical Co., selectively hydrogenated styrene-butadiene type A-B block copolymer
[b(ii)]Lexan 135, General Electric Co.

EXAMPLE 3

The general procedure of Examples 1 and 2 is used to make a composition of poly(1,4-butylene terephthalate), poly(ethylene terephthalate), hydrogenated styrene-butadiene A-B block copolymer and aromatic polycarbonate with enhanced impact properties. The data are set forth in Table 2.

TABLE 2

Compositions Comprising Polyesters, A Styrene-Butadiene A-B Block Copolymer, and an Aromatic Polycarbonate

| Example | 3 |
|---|---|
| Composition (parts by weight) | |
| Poly(1,4-butylene terephthalate)[a] | 48.3 |
| Poly(ethylene terephthalate) | 20.0 |
| S/B A-B Block copolymer[b(i)] | 15 |
| Aromatic Polycarbonate[b(ii)] | 15 |
| Mold release stabilizers (to make 100) | |
| Properties | |
| Distortion temperature under load, °F. at 264 psi | 140 |
| Tensile strength, psi | 6500 |
| Flexural strength, psi | 10,500 |
| Modulus, psi | 290,000 |
| % Elongation | 119 |
| Notched Izod impact strength, ft.lbs./in. | 2.32 |
| Unnotched Izod impact strength, ft.lbs./in. | no break |

[a], [b(i)], [b(ii)]See footnotes to Table 1.

EXAMPLES 4–6

Filled, impact modified compositions are prepared by the general procedure of Example 1 from poly(1,4-butylene terephthalate), optionally, poly(ethylene terephthalate), hydrogenated styrene-butadiene A-B type block copolymer, aromatic polycarbonate and glass fibers or clay. They are impact resistant, and have the properties set forth in Table 3.

TABLE 3

Compositions Comprising Polyesters, A Styrene-Butadiene A-B Block Copolymer, an Aromatic Polycarbonate and Filler

| Example | 4 | 5 | 6 |
|---|---|---|---|
| Composition (parts by weight) | | | |
| Poly(1,4-butylene terephthalate)[a] | 58.3 | 33.3 | 58.3 |
| Poly(ethylene terephthalate) | — | 25 | — |
| S/B A-B Block Copolymer[b(i)] | 15 | 15 | 15 |
| Aromatic polycarbonate[b(ii)] | 15 | 15 | 15 |
| Glass fibers[c(i)] | 10 | 10 | — |
| Clay[c(ii)] | — | — | 10 |
| Mold release/stabilizers (to make 100) | | | |
| Properties | | | |
| Distortion Temperature under load, °F. at 264 psi | 244 | 219 | 150 |
| Tensile strength, psi | 8200 | 8400 | 6099 |
| Flexural strength, psi | 12,600 | 13,000 | 10,576 |
| Modulus, psi | 390,000 | 400,000 | 312,470 |
| % Elongation | 7.1 | 6.4 | 38 |
| Notched Izod impact strength, ft.lbs./in. | 2.3 | 2.0 | 3.2 |
| Unnotched Izod impact strength, ft.-lbs./in. | 12.8 | 13.4 | no break |

[a], [b(i)], [b(ii)]see footnotes to Table 1.
[c(i)], [c(ii)]Satintone Clay, Englehard Co., New Jersey, U.S.A., treated with 0.13% by weight of A-1100, gamma-aminopropylethoxysilane coupling agent.

EXAMPLE 7

A fire retarded, impact modified composition is prepared by the general procedure of Example 1 using poly(1,4-butylene terephthalate), hydrogenated styrene-butadiene A-B type block copolymer, aromatic polycarbonate, a flame retardant amount of a 50:50 weight % copolycarbonate of tetrabromobisphenol-A and bisphenol-A and a synergistic amount of antimony oxide. A high impact strength molding composition is obtained. The data are set forth in Table 4.

TABLE 4

Composition Comprising Polyester, a Styrene-Butadiene A-B Block Copolymer, an Aromatic Polycarbonate and Flame Retardant

| Example | 7 |
|---|---|
| Composition (parts by weight) | |
| Poly(1,4-butylene terephthalate)$^{(a)}$ | 36.8 |
| S/B A-B Block Copolymer$^{(b)(i)}$ | 15 |
| Aromatic polycarbonate$^{(b)(ii)}$ | 15 |
| Copolycarbonate of 50-50 wt. % bisphenol A-tetrabromobisphenol A | 28 |
| Antimony oxide | 5 |
| Mold release/stabilizers (to make 100) | |
| Properties | |
| Distortion temperature under load, °F. at 264 psi | 199 |
| Tensile strength, psi | 6500 |
| Flexural strength, psi | 10,600 |
| Modulus, psi | 300,000 |
| % Elongation | 44 |
| Notched Izod impact strength, ft.-lbs./in. | 11.3 |
| Unnotched Izod impact strength, ft.-lbs./in. | no break |
| Underwriters Laboratories test Bull 94 (0.30" sample) | V-O |

$^{(a); (b)(i); (b)(ii)}$See footnotes to Table 1

EXAMPLE 8

An impact modified composition comprising a block copolyester of poly(1,4-butylene terephthalate) and an aromatic/aliphatic polyester (Valox 330, General Electric Co.), a hydrogenated styrene-butadiene A-B type block copolymer, and an aromatic polycarbonate is prepared by the general procedure of Example 1. The formulation produces molded articles with excellent impact strength. The data are set forth in Table 5.

TABLE 5

Composition Comprising Block Copolyester, a Styrene-Butadienie A-B Block Copolymer and an Aromatic Polycarbonate

| Example | 8 |
|---|---|
| Composition (parts by weight) | |
| Block copolyester of poly(1,4-butylene terephthalate)$^{(a)(i)}$ | 68.3 |
| S/B A-B Block Copolymer$^{(b)(i)}$ | 15 |
| Aromatic polycarbonate$^{(b)(ii)}$ | 15 |
| Mold release/stabilizers (to make 100) | |
| Properties | |
| Distortion temperature under load, °F. at 264 psi | 110 |
| Tensile strength, psi | 4700 |
| Flex strength, psi | 8200 |
| Modulus, psi | 230,000 |
| % Elongation | 42 |
| Notched Izod impact strength ft.-lbs./in. | 3.2 |
| Unnotched Izod impact strength, ft.-lbs./in. | no break |

$^{(a)(i)}$VALOX 330, General Electric Co.
$^{(b)(i); (b)(ii)}$See footnotes to Table 1.

Obviously, other modifications and variations of the present invention are possible in the light of the above teachings. For example, the reinforced and/or filled compositions can be rendered flame retardant, and the copolyester can be partially replaced with poly(1,4-butylene terephthalate) or poly(ethylene terephthalate). It is therefore, to be understood that changes may be made in the particular embodiments described above which are within the scope of the invention as defined in the appended claims.

I claim:

1. A thermoplastic composition consisting essentially of:
   (a) a polyester composition consisting essentially of:
      (i) a poly(1,4-butylene terephthalate) resin;
      (ii) a blend of a poly(1,4-butylene terephthalate) resin and a poly(ethylene terephthalate) resin;
      (iii) a block copolyester of poly(1,4-butylene terephthalate) and an aromatic/aliphatic or aliphatic polyester;
      (iv) a blend of (iii) and a poly(ethylene terephthalate) resin; or
      (v) a blend of (iii) and a poly-(1,4-butylene terephthalate) resin; and
   (b) an impact modifier therefor consisting essentially of a combination of:
      (i) a selectively hydrogenated block copolymer resin of a vinyl aromatic monomer (A) and a conjugated diene (B) of the A-B type; and
      (ii) an aromatic polycarbonate resin, in an amount of up to 60 parts per 100 parts by weight of (a) and (b) together.

2. A composition as defined in claim 1 wherein the impact modifier (b) is present in an amount of at least about 1.0 parts by weight per 100 parts by weight of (a) and (b) together.

3. A composition as defined in claim 1 wherein the modifier (b) is present in an amount of from about 2.5 to about 50 parts by weight per 100 parts by weight of (a) and (b) together.

4. A composition as defined in claim 1 wherein each said polyester in component (a) has an intrinsic viscosity of at least about 0.4 deciliters/gram when measured in a solution in a 60:40 mixture of phenol and tetrachloroethane at 30° C.

5. A composition as defined in claim 4 wherein each said polyester in component (a) has an intrinsic viscosity of at least about 0.6 deciliters per gram when measured in a solution in a 60:40 mixture of phenol and tetrachloroethane at 30° C.

6. A composition as defined in claim 1 wherein in components (a)(i), (a)(ii) and (a)(v), said poly(1,4-butylene terephthalate) resin is linear or branched.

7. A composition as defined in claim 6 wherein said branched polyester is a high melt viscosity (1,4-butylene terephthalate) resin which includes a small amount of a branching component containing at least three ester forming groups.

8. A composition as defined in claim 1 wherein said block copolymer resin component (b)(i) includes (A) units derived from styrene and (B) units derived from butadiene.

9. A composition as defined in claim 1 wherein said aromatic polycarbonate resin includes units derived from bisphenol-A.

10. A composition as defined in claim 1 which also includes (c) a filler, reinforcing agent or a mixture thereof in an amount of from about 1 to about 60 parts by weight per 100 parts by weight of (a), (b) and (c) together.

11. A thermoplastic composition as defined in claim 10 wherein component (c) comprises (c)(i) fibrous glass.

12. A thermoplastic composition as defined in claim 10 wherein component (c) comprises (c)(ii) clay.

13. A composition as defined in claim 1 which also includes (d) a flame-retardant amount of a flame retardant agent.

14. A composition as defined in claim 13 wherein component (d) comprises an aromatic polycarbonate containing units of tetrabromobisphenol-A and said units are present in said composition in an amount at least sufficient to render the composition flame retardant.

* * * * *